(12) United States Patent
Iotti (10) Patent No.: US 10,479,261 B2
(45) Date of Patent: Nov. 19, 2019

(54) TOWABLE TROLLEY FOR THE TRANSPORT OF EQUIPMENT

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 241 days.

(21) Appl. No.: 15/491,128

(22) Filed: Apr. 19, 2017

(65) Prior Publication Data

US 2017/0334332 A1 Nov. 23, 2017

(30) Foreign Application Priority Data

May 18, 2016 (IT) .................. 102016000050942

(51) Int. Cl.
*B60P 7/08* (2006.01)
*B60P 7/135* (2006.01)

(52) U.S. Cl.
CPC ........... *B60P 7/0807* (2013.01); *B60P 7/0892* (2013.01); *B60P 7/135* (2013.01)

(58) Field of Classification Search
CPC .......... B60P 3/06; B60P 3/073; B60P 7/0815; B60P 7/0892
USPC ........ 410/44, 45, 120, 2, 80, 34, 98, 97, 91, 410/82; 414/800, 470, 458, 460, 624, 414/639, 803
See application file for complete search history.

(56) References Cited

U.S. PATENT DOCUMENTS

| | | | |
|---|---|---|---|
| 4,027,892 A | 6/1977 | Parks | |
| 5,607,270 A | 3/1997 | Zimmerman | |
| 6,077,004 A | 6/2000 | Denman, Jr. | |
| 6,464,436 B1 | 10/2002 | Davis | |
| 7,137,764 B2 * | 11/2006 | Johnson | B60P 3/07 410/101 |
| 8,267,627 B1 * | 9/2012 | Ward | B60P 3/073 410/3 |
| 8,668,415 B2 * | 3/2014 | Yogodzinski | B60P 3/40 410/44 |
| 9,011,054 B2 * | 4/2015 | Thomsen | F03D 13/40 410/44 |
| 2013/0315685 A1 * | 11/2013 | Pedersen | B60P 3/40 410/44 |
| 2016/0053740 A1 * | 2/2016 | Landrum | B61D 3/16 414/800 |

* cited by examiner

*Primary Examiner* — D Glenn Dayoan
*Assistant Examiner* — Sunsurraye Westbrook
(74) *Attorney, Agent, or Firm* — Pearne & Gordon LLP

(57) ABSTRACT

The towable trolley (1) for the transport of equipment (2, 3, 4, 5, 6) intended to be mounted on telescopic loaders or the like, comprising a support platform (10), movement members (7), for example wheels or the like, and one or more attachment units (8, 11, 12, 13, 14, 15, 16, 17, 18, 20), mounted on said platform (10) and adapted to stably secure at least one equipment to the platform (10) itself.

15 Claims, 13 Drawing Sheets

TOWABLE TROLLEY FOR THE TRANSPORT OF EQUIPMENT

The present invention relates to a towable trolley for the transport of equipment to be assembled on self-propelled operating machines, such as telescopic loaders or other similar machinery.

Telescopic loaders (or telehandlers) are known, comprising a vehicle equipped with a movable frame on tracks or wheels and comprising a driving cab and an extendable manoeuvring boom.

At the distal end of the boom, an equipment or "accessory" is mounted, for lifting or moving loads, such as a fork, a load basket, a winch or even a horizontal beam for a crane (the so-called "jib"), etc . . . .

Precisely, the equipment is coupled, in a separable way, to the distal end of the boom, through a suitable attachment means.

Loaders are often roadworthy vehicles and can therefore be simply driven to the work site, for example a construction site or mine, as long as they can be reached by the road network.

Furthermore, loaders are often able to move "off-road" and can therefore also reach the site even if it is not accessible via a proper road network.

In many cases, during the performance of the different operations to be completed at such work sites, loaders use different accessories alternately, which must therefore be available at the actual sites.

Currently, the accessories are taken individually to the work sites using transport vehicles, such as trucks and the like, which has a strong impact on the costs sustained by companies using loaders.

In some cases, the accessories are even transported with "makeshift means" to which they are fixed precariously, with potential road safety risks and risks for the safety of the operators.

Furthermore, it is to be considered that, to safely apply and remove the fastening means, preventing accidents that can damage the equipment or the operators, a substantial amount of time is needed.

In this context, the technical task underpinning the present invention is to provide a towable trolley for the transport of equipment which obviates the drawbacks of the prior art as cited above.

The stated technical task is achieved by the trolley constructed in accordance with claim 1.

Further characteristics and advantages of the present invention will become more apparent from the following indicative, and hence non-limiting, description of a preferred, but not exclusive, embodiment of a towable trolley as illustrated in the appended drawings, in which.

With reference to the appended drawings, 1 indicates a towable trolley according to the present invention.

The proposed trolley 1 was designed to transport equipment intended to be mounted on telescopic loaders or other self-propelled operating machines.

Precisely, the equipment transported by the trolley 1 is preferably suitable to be mounted onto the telescopic arm of operating machines, such as those mentioned in the discussion of the prior art, and in particular: forks 4, load baskets 2, winches 5, jibs 6 and potence curt (i.e. a heavy duty frame for carrying a hook) or "PC" equipment 3, for fastening a crane hook.

In even more detail, the trolley 1 according to the invention was designed to be towed by a telehandler or other vehicles, defining a roadworthy "towed operating machine".

The proposed trolley 1 includes a support platform (only schematically shown in the appended drawings), for example, of a quadrangular shape, adapted to sustain a plurality of equipment 2, 3, 4, 5, 6, for example, arranged alongside one another above the upper surface of the platform 10.

The platform 10 may be mounted on a base frame (not shown) equipped inferiorly with wheels 7, preferably idle, for the purpose of movement on the ground, particularly on the road surface; however, it is not excluded that the invention may adopt different types of movement members.

According to an important aspect of the invention, the trolley 1 comprises at least one attachment unit 8, 11, 12, 13, 14, 15, 16, 17, 18, 20, mounted on the platform and adapted to stably secure at least one equipment to the platform 10 itself.

Preferably, the trolley 1 is equipped with a plurality of attachment units, each of which is configured to stably anchor an equipment loaded onto the platform 10.

In detail, the attachment units are adapted to allow both the coupling and uncoupling of the equipment 2, 3, 4, 5, 6 transported.

In the examples shown in the appended figures, each equipment transported on the trolley 1 is stably secured to a respective unit, however, the case is not excluded in which the same attachment unit can couple more than one equipment.

Preferably, the attachment units are removably fastened to the upper surface of said platform 10.

Precisely, the invention may envisage a plurality of fastening seats (not shown in the appended figures, for the purpose of the legibility of the figures), distributed across the upper surface of the platform 10, and a plurality of fastening elements, engageable with the seats and provided for the removable fastening of the attachment units.

In even more detail, a multiplicity of seats may be provided, which may even be distributed uniformly along a part or substantially all of the surface of the platform 10.

Preferably, the seats comprise holes afforded on the upper surface of the platform 10, while the fastening elements comprise elements that can be inserted in the holes and adapted for mechanical engagement with the holes themselves.

In this case, the attachment units may provide through holes at the relative support base, to be arranged at the holes in the platform 10, so as to be able to insert the fastening elements therein, in order to removably fasten the units to the platform 10.

The holes in the platform 10 may be threaded and, in this case, the fastening elements are screws or other threaded elements.

However, to allow the removable fastening of the attachment units 10, alternative fastening means to those described above are also possible, for example, joints, etc . . . .

Furthermore, the removable fastening means may be configured so as to allow the attachment units to move (for example to slide) on the platform 10, although remaining anchored thereto.

In practice, versions of the invention are possible in which the position of the attachment units fastened to the platform 10, or a part thereof, may be regulated by the operators without having to remove and then re-fasten the attachments themselves.

The provision of the fastening seats described above allows the operators to decide as they prefer where to arrange the attachment units on the platform 10 and to change the positions thereof based on the different use requirements, considering the correct distribution of the weights.

This aspect will be discussed further in the explanation of the operation of the invention.

The invention may provide either attachment units that allow automatic coupling of the equipment or attachment units in which the coupling is manual; of course, the trolley 1 can host both types of units.

The attachment units of the proposed trolley 1 can be classified as adapted for the coupling of one or more hollow tubular elements, with a quadrangular section or adapted for the coupling of at least one tubular element, with a substantially circular section.

In fact, as will be clarified below with the aid of the figures, many of the equipment to be transported by the trolley 1 is equipped with quadrangular tubular elements 21, 51 (typically adapted to be forked) and/or circular tubular elements 31, 41.

In any case, the attachment units may comprise one or more positioning elements 11, 12, 13, 14, 20 adapted for mechanical engagement with equipment to be transported and at least one coupling device 15, 16, 17, 18 adapted to allow the coupling and uncoupling of the equipment engaged by the positioning element.

In practice, the units may be equipped with elements 11, 12, 13, 14, 20 that are used to correctly position and hold still a part of the equipment 2, 3, 4, 5, 6, while devices 15, 16, 17, 18 are provided, which couple the rest of the equipment, so that it is securely anchored to the platform 10, without the possibility to move, except for any small oscillations due to mechanical clearances or the vibrations caused by transport.

In general terms, as well as allowing the centring of the equipment, the positioning elements 11, 12, 13, 14, 20 may allow a kinematic constraint that removes at least a degree of freedom from the equipment; the coupling device 15, 16, 17, 18 anchors the centred equipment so as to further constrain it in order to make it substantially integral with the platform 10.

In particular, the equipment 2, 3, 4, 5, 6 may in part rest on the surface of the platform 10 or be supported by the coupling device 15, 16, 17, 18 or both.

If the equipment rests on the platform 10, the latter may also constitute a constraint on its movement.

Again in relation to the positioning element 11, 12, 13, 14, 20 it is preferably fastened onto an upper surface of the platform 10 and may comprise a horizontal and/or projecting retaining portion, which inferiorly defines an undercut 19 which, as will be explained in detail below, constitutes a seat which receives a part of the constrained equipment.

Precisely, the undercut 19 is defined between the retaining portion and the surface of the platform 10.

Each positioning element 11, 12, 13, 14, 20 can be defined by a metal body fastened to the platform 10 which conforms a portion that extends vertically, from whose upper end the aforementioned retaining portion originates, which is therefore distanced from the platform 10.

Firstly, preferential embodiments of the automatic attachments and then preferential embodiments of the manual attachments will be described below.

In the automatic attachment units, the coupling device 15, 16, 17 may comprise at least one movable element 151, 161, 171, adapted to abut a portion of the coupled equipment and also an elastic contrast element which acts on the movable element 151, 161, 171.

Preferably, the movable element is equipped with a rotatable contact member 152, 162, 171; the rotatable element is preferably idle and may for example be a roller 152, 162 or a sphere 171.

In at least three of the embodiments of the automatic attachment units, the coupling devices 15, 16, 17 have a movable element 151, 161, 171 which is adapted to translate between a retracted position and an extended position; in this case, the translation of the movable element 151, 161, 171 is subject to the action of an elastic means, comprising for example one or more springs.

In detail, the extended position is a rest position, while the retracted position is the loading position of the elastic means.

In detail, as shown in FIGS. 3, 4, 5, 10 and 11 a type of automatic attachment unit described in the previous paragraph is intended to secure to the platform 10 equipment with a pair of tubular elements 51, 21 for example quadrangular, having a first and a second open end, opposite one another and adapted to be forked, to allow the lifting thereof.

In practice, equipment such as the load basket 2 and the winch 4 are provided at the base with a pair of tubular elements 21, 51 through which they are taken by lift trucks equipped with lifting forks.

To anchor such equipment 21, 51, the invention may provide a pair of positioning elements 12 adapted to be engaged with a first end of a respective tubular element 21, 51.

Precisely, the two positioning elements 12 have a respective plate-shaped retaining portion, which extends in a cantilever fashion; in this case, the retaining elements may have an overturned L-shaped cross section.

In practice, below the projecting portion a lower wall of a relative tubular element 21, 51 of the equipment is inserted, which is housed in the aforementioned undercut 19.

The distance between the positioning elements 12 and the height of the projecting portion are chosen so as to constrain the tubular element 21, 51 of the equipment 2, 5 to be secured to the trolley 1.

This automatic attachment unit also comprises two coupling devices 15 which engage the opposite open end of the tubular elements 21, 51 which can be forked by the equipment 2, 5.

As mentioned, such devices 15 have movable elements 151 that can oscillate between two positions; preferably, such oscillation is performed along horizontal directions or along directions however parallel to the platform 10.

Furthermore, the movable elements 151 project (for example in a cantilever fashion) and are equipped with a contact idle roller 152 at the free end.

In practice, as shown in FIGS. 3, 4, 5, 10 and 11, for the purpose of the secure anchoring of this type of equipment 2, 5 to the trolley 1, first of all, first ends of the pair of tubular elements 21, 51 of the equipment, positioned on the same side, are engaged simultaneously with respective positioning elements 12, which are arranged side by side.

In this step, the equipment 2, 5 can be inclined with respect to the platform 10 with the first ends of the tubular elements 21, 51 which are placed at the platform 10 and have a respective lower wall inserted in a relative undercut 19 of the positioning element 12, while second opposite ends of the tubular elements 21, 51 are raised and distanced from the platform 10 itself.

Figure 4:
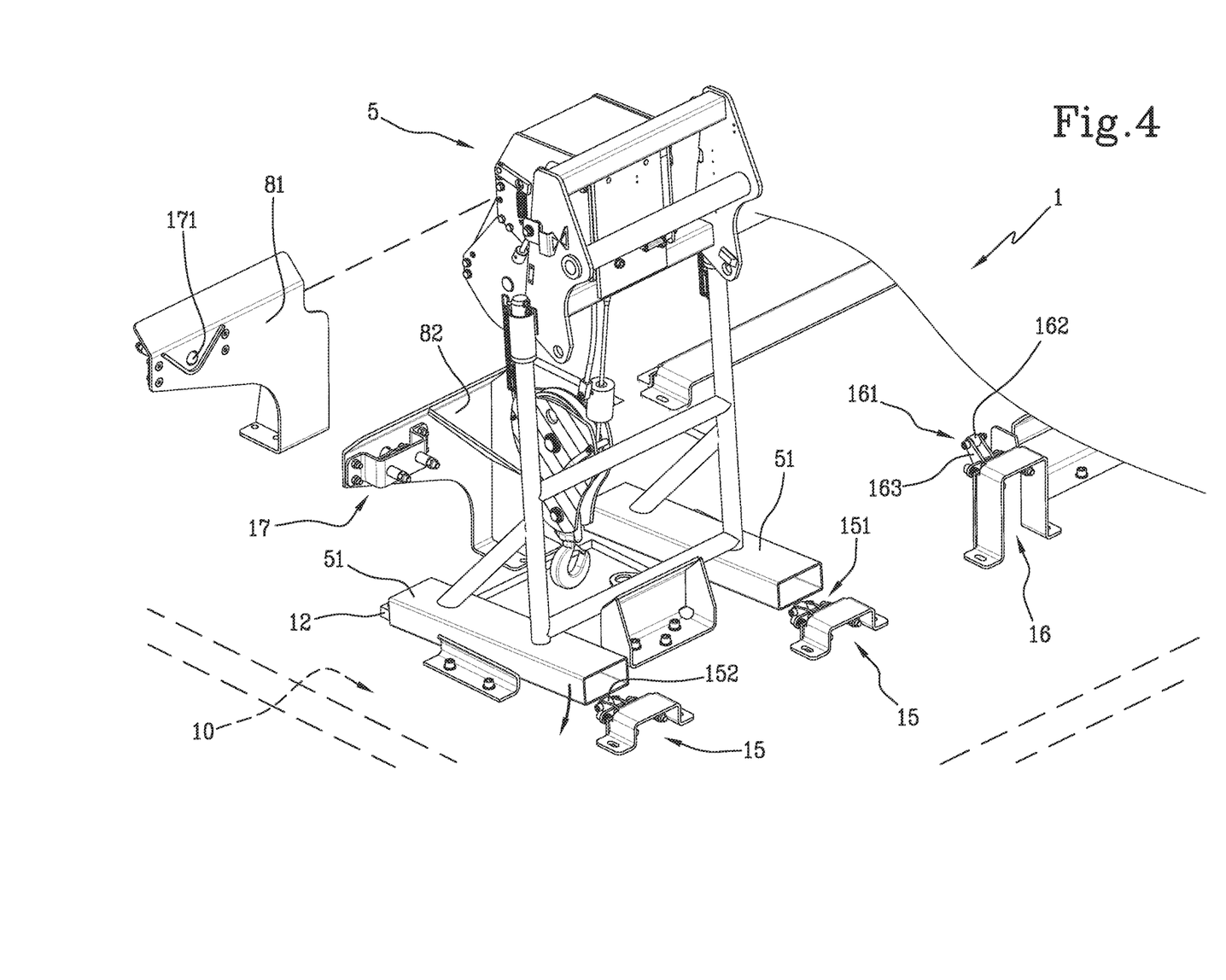
Figure 5:
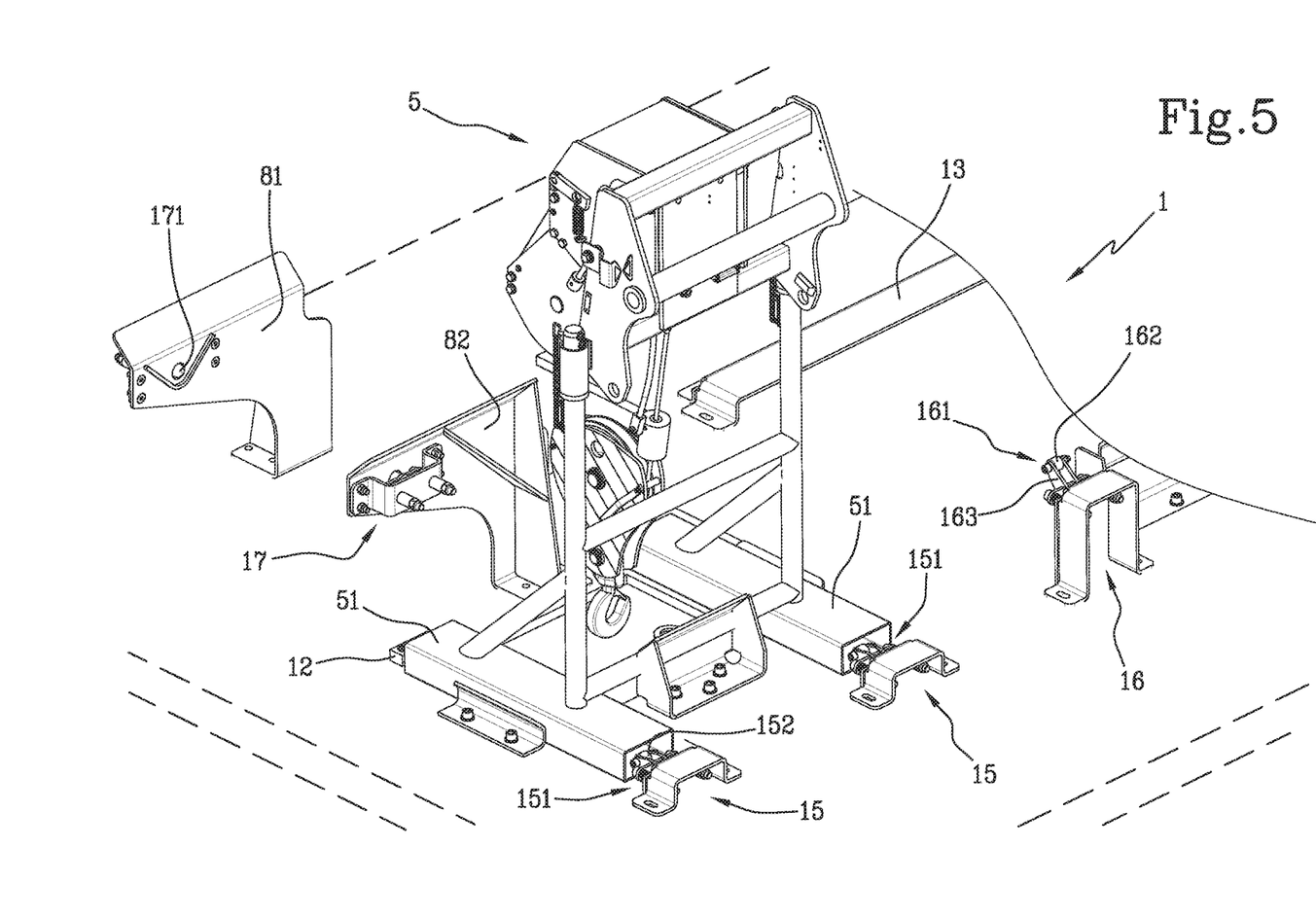

At this point, the equipment 2, 5 is left to turn, so that the aforementioned second ends of the tubular elements 21, 51 are lowered and abut the movable elements 151 of two coupling devices 15, arranged side by side and aligned with respective positioning elements 12 (see in particular FIG. 4).

In detail, the lower wall of each of the tubular elements 21, 51, placed at or in proximity to the second end, abuts the roller 152 of the relative movable element 151, which is therefore moved into a retracted position, in which it loads the spring or other elastic element.

When they move, the movable elements 151 allow the tubular elements 51 to rest their own lower surface on the platform 10, parallel thereto.

When the rollers 152 have passed the lower edge of the second end of the tubular element 21, 51, the spring moves the movable elements 151 into their extended rest position, in which they are threaded into the openings in the tubular elements 21, 51 locking them in position.

Figure 6:
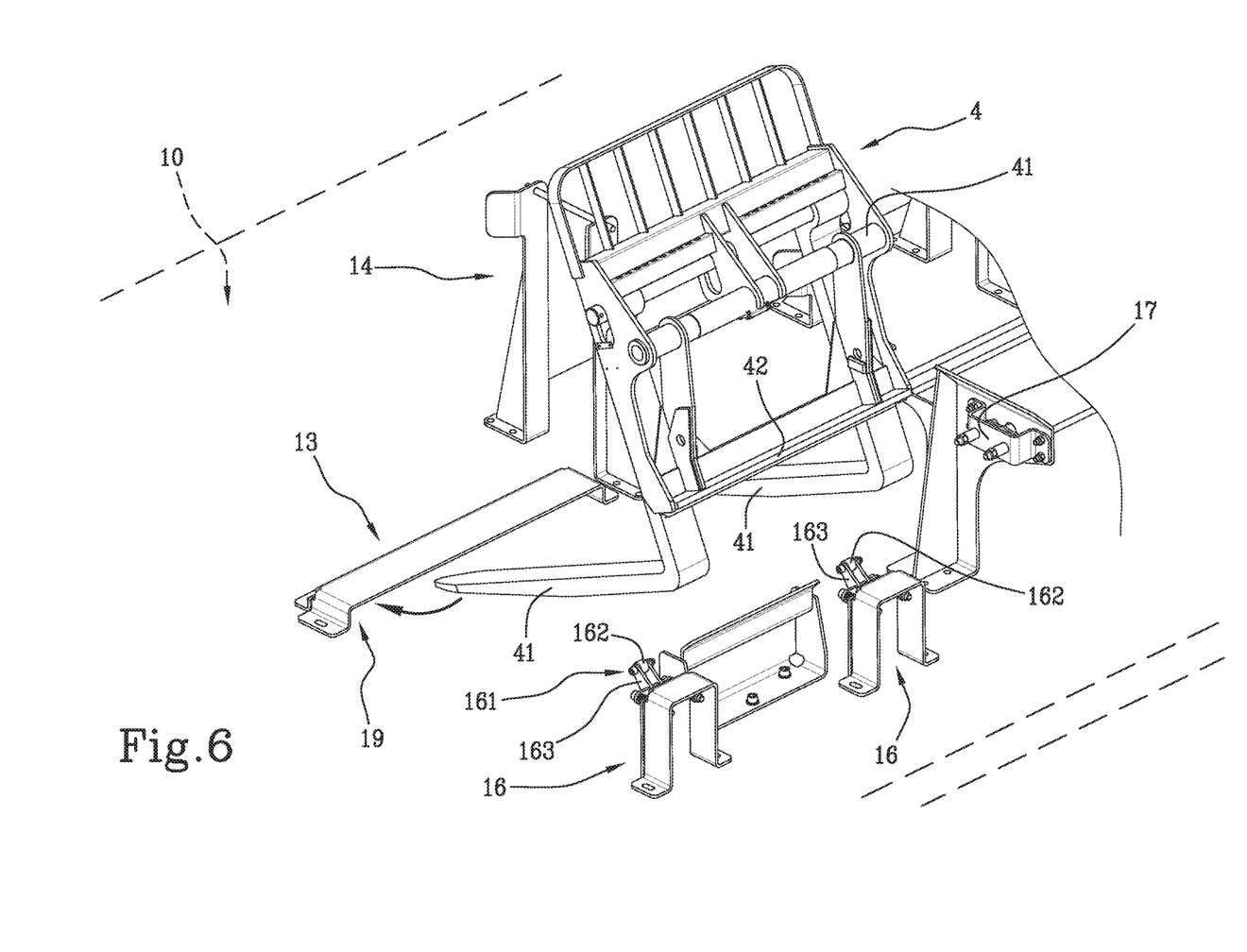
Figure 7:
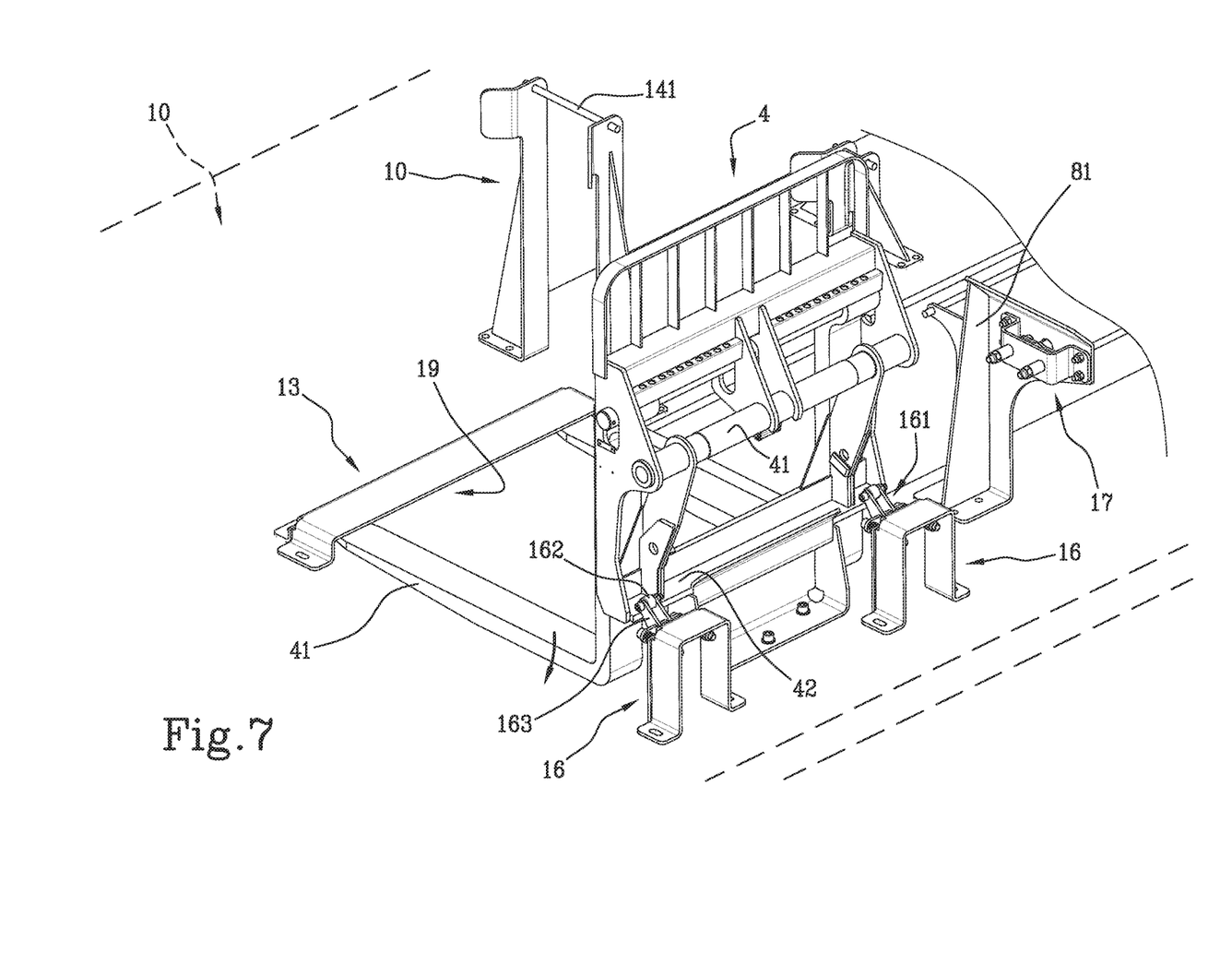

The invention may then provide an attachment unit, similar but not identical to that described in the previous paragraphs and intended to secure to the platform 10 an equipment provided with a pair of prongs 41, such as, for example, a fork 4 (see FIGS. 6 and 7).

In this case, the attachment may be provided with one or more positioning elements 13 adapted to engage the free end of at least one prong 41 inserted into the relative undercut 19.

In the version depicted, the attachment apparatus comprises a single elongated positioning element 13, provided on one side with an access to the undercut 19, in which both prongs 41 can be inserted contextually for their engagement with the trolley 1.

Furthermore, this attachment comprises at least one coupling device 16 (preferably two) provided for superiorly coupling a part 42 of the equipment 4 opposite the prongs 41.

In detail, the forks 4 or other similar equipment, are provided with a rear side opposite the prongs 41, which is equipped with a projecting portion 42, for example a horizontal plate, or one or more ribs or one or more shoulders, etc. . . . .

In this case, the movable element 161 of each coupling device 16 comprises a projecting arm 163 provided with a contact roller 162.

The arm 163 may for example be inclined upwards and is however intended to allow the engagement of the coupling device with the aforementioned projecting portion 42 of the fork 4.

The coupling of the fork 4 is performed with a movement similar to that used for the basket 2 or the crane 5.

Initially, the fork 4 is carried on the trolley 1 in an inclined configuration and the tips of the prongs 41 are threaded into the positioning element 13.

At this point, the rear side of the fork 4 is also lowered, which pushes against the rollers 162 of the movable elements 161, causing a translation of the latter into the retracted position, at the same time loading the aforementioned elastic means.

When the rollers 162 have passed the edge of the aforementioned projecting portion 42, the fork 4 may be rested on the platform 10 and the arms 163 of the coupling devices 16 pass over the projecting portion 42 itself, locking it superiorly, securely anchoring the fork 4 to the trolley 1.

Figure 8:
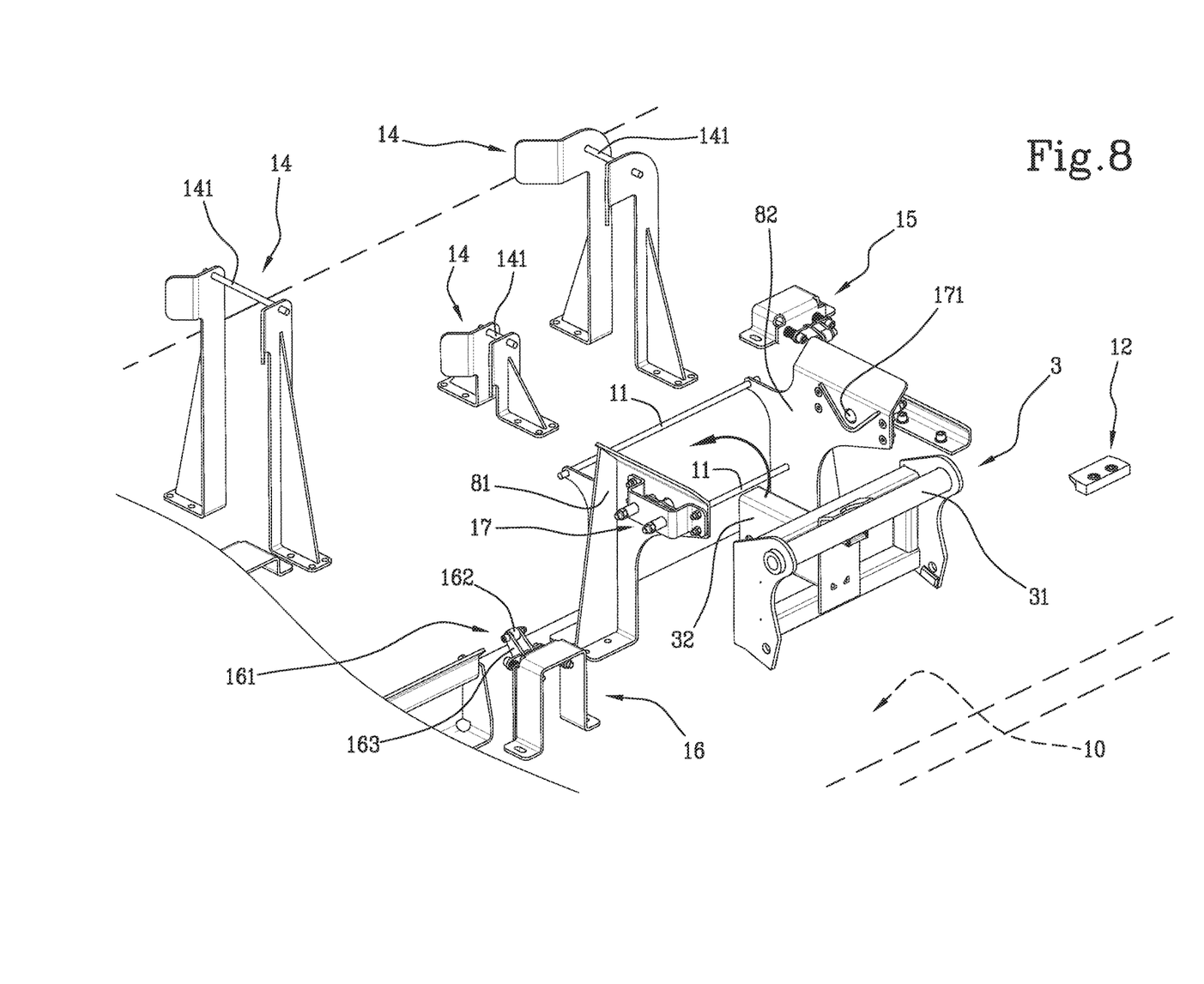
Figure 9:
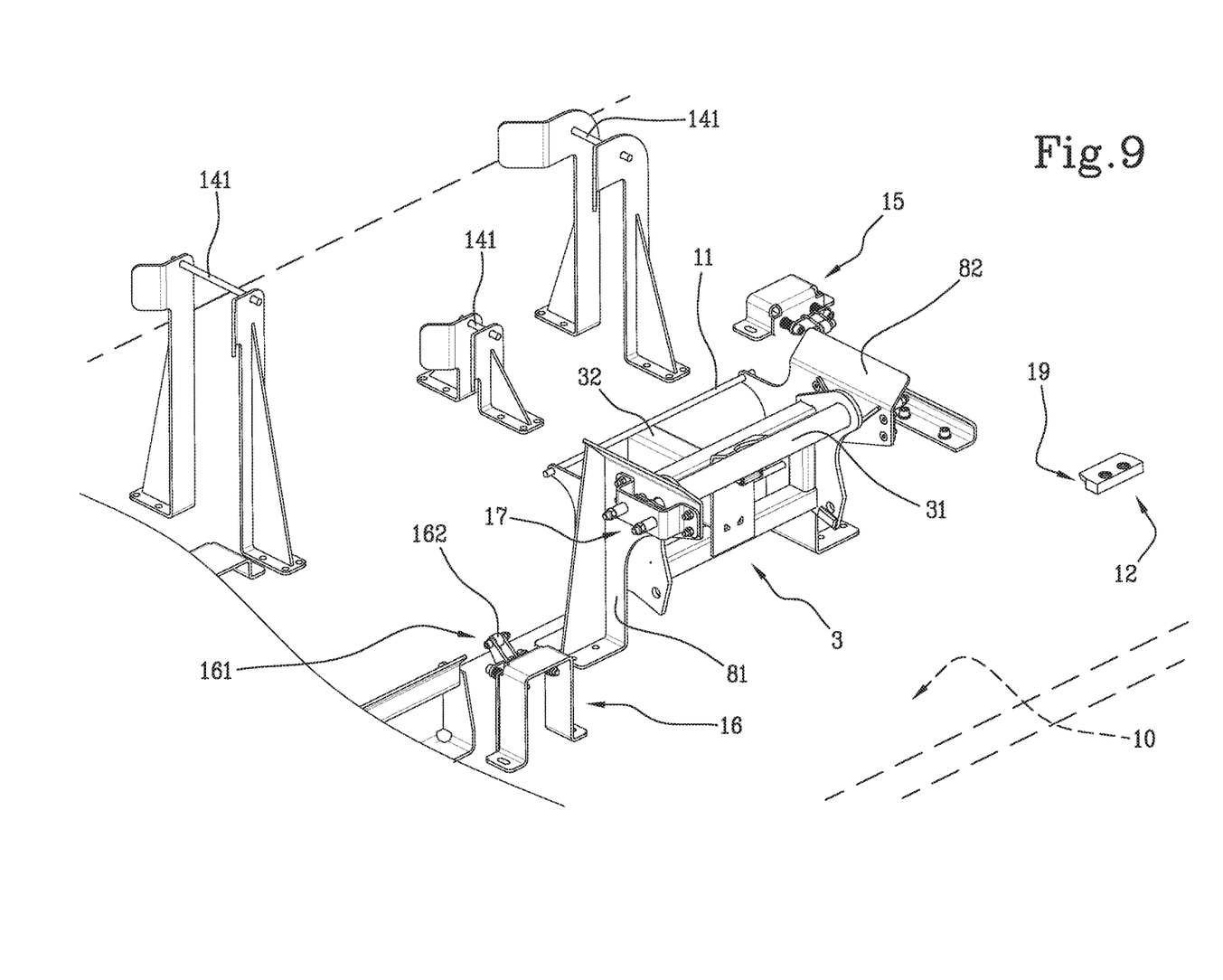
Figure 10:
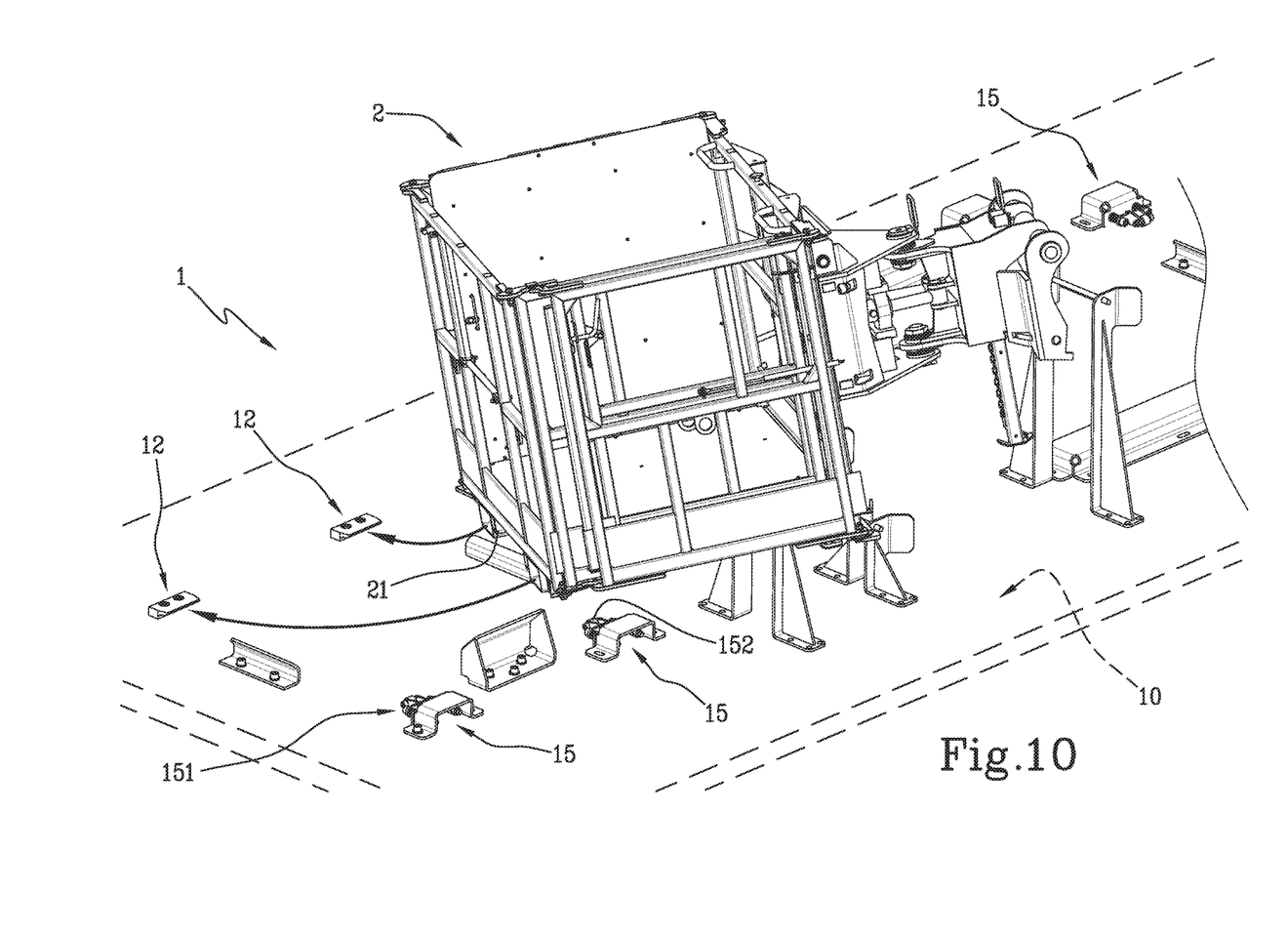
Figure 11:
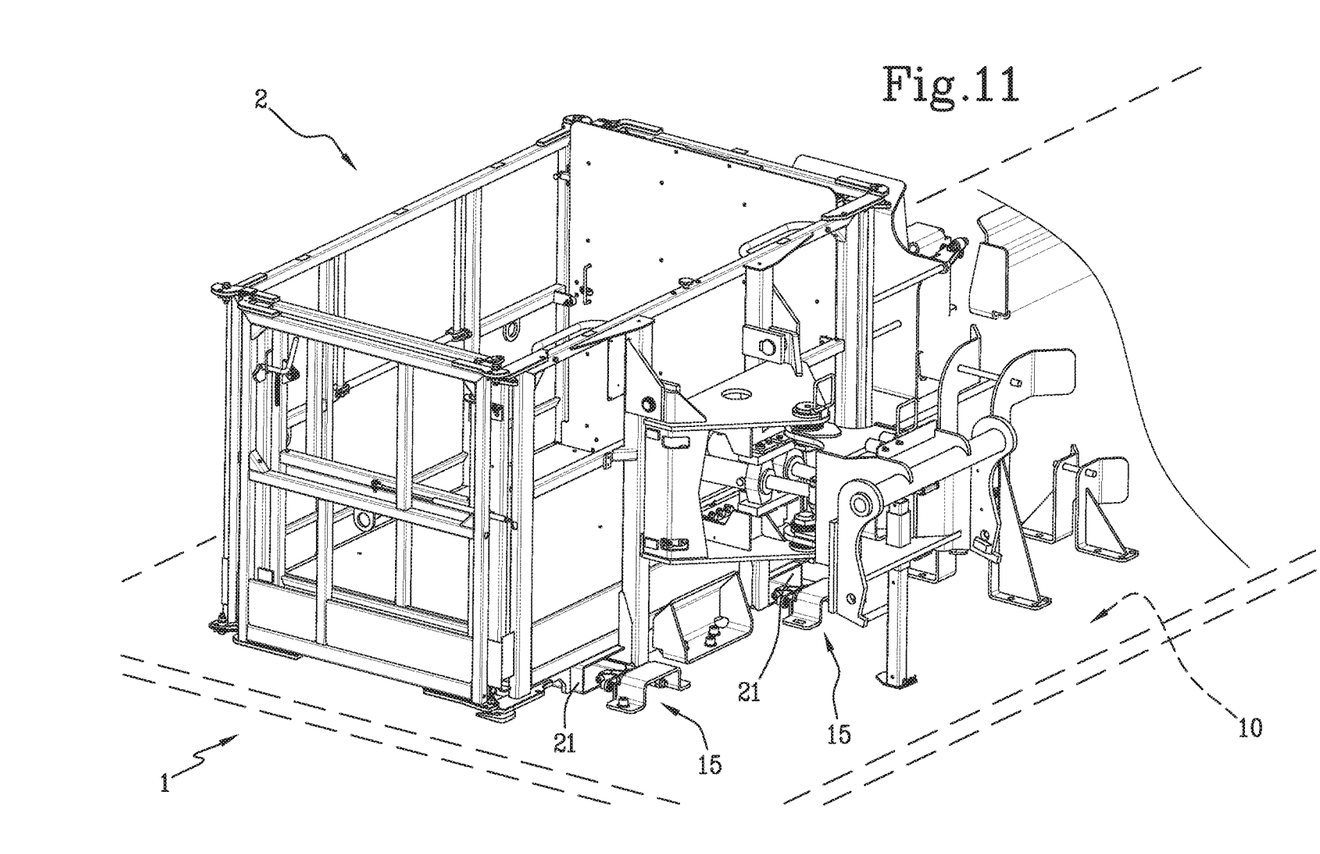

The invention may also envisage a further attachment unit which includes at least one coupling device whose movable element 17 is provided with a sphere 171 (see for example FIGS. 8 and 9).

In detail, in this type of attachment, a housing structure 8, or "cradle" is provided, equipped with two side walls 81, 82 between which an equipment 3, 6 may be inserted.

Each of the side walls 81, 82 may mount a device 17 equipped with a movable sphere 171, i.e, a sphere 171 that translates between an external rest position and a retracted position, in which it loads a respective elastic contrast element.

Figure 1:
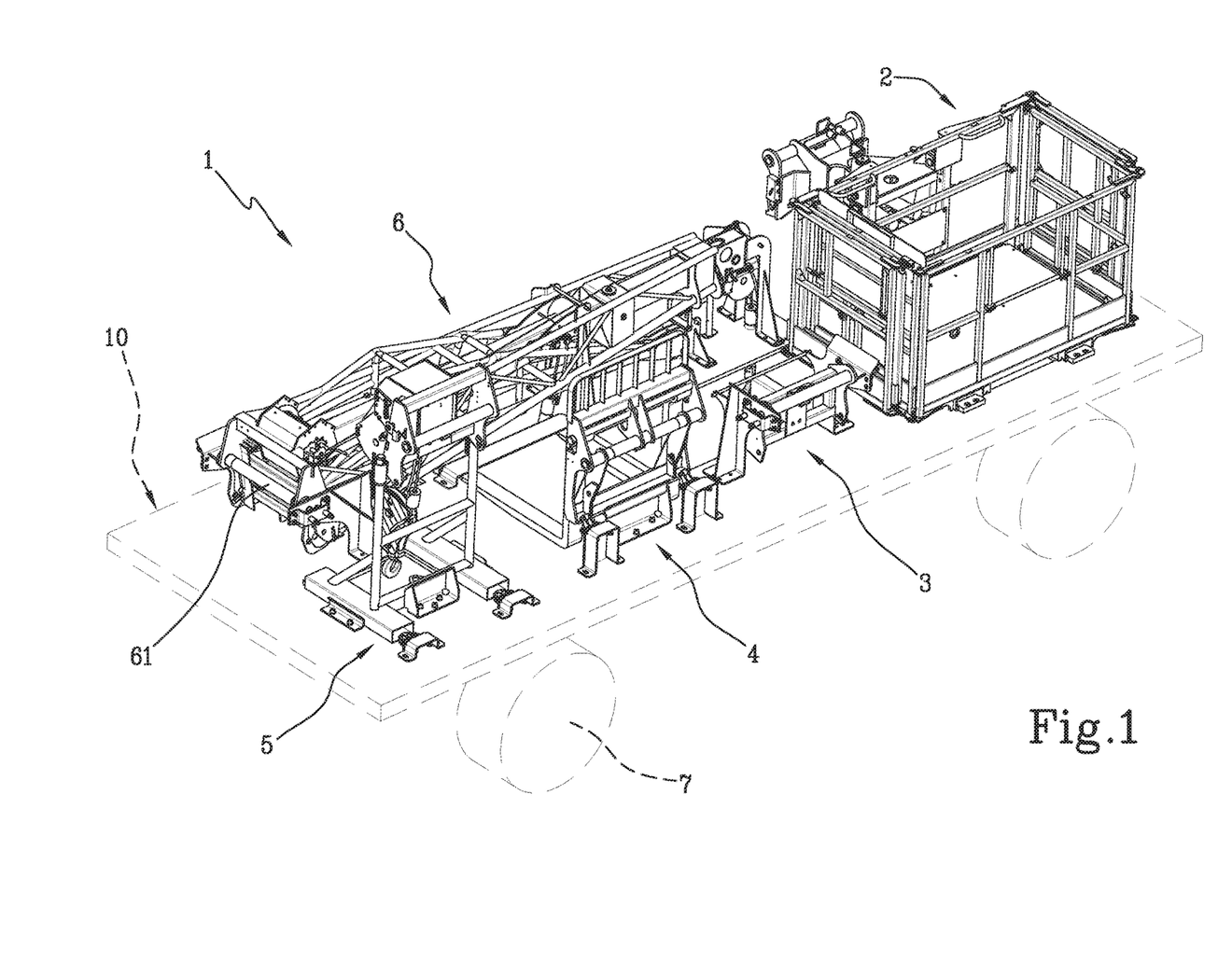
FIG. 1 is an axonometric, partially schematic, view of the trolley of the invention, which houses examples of transportable equipment.
Figure 2:
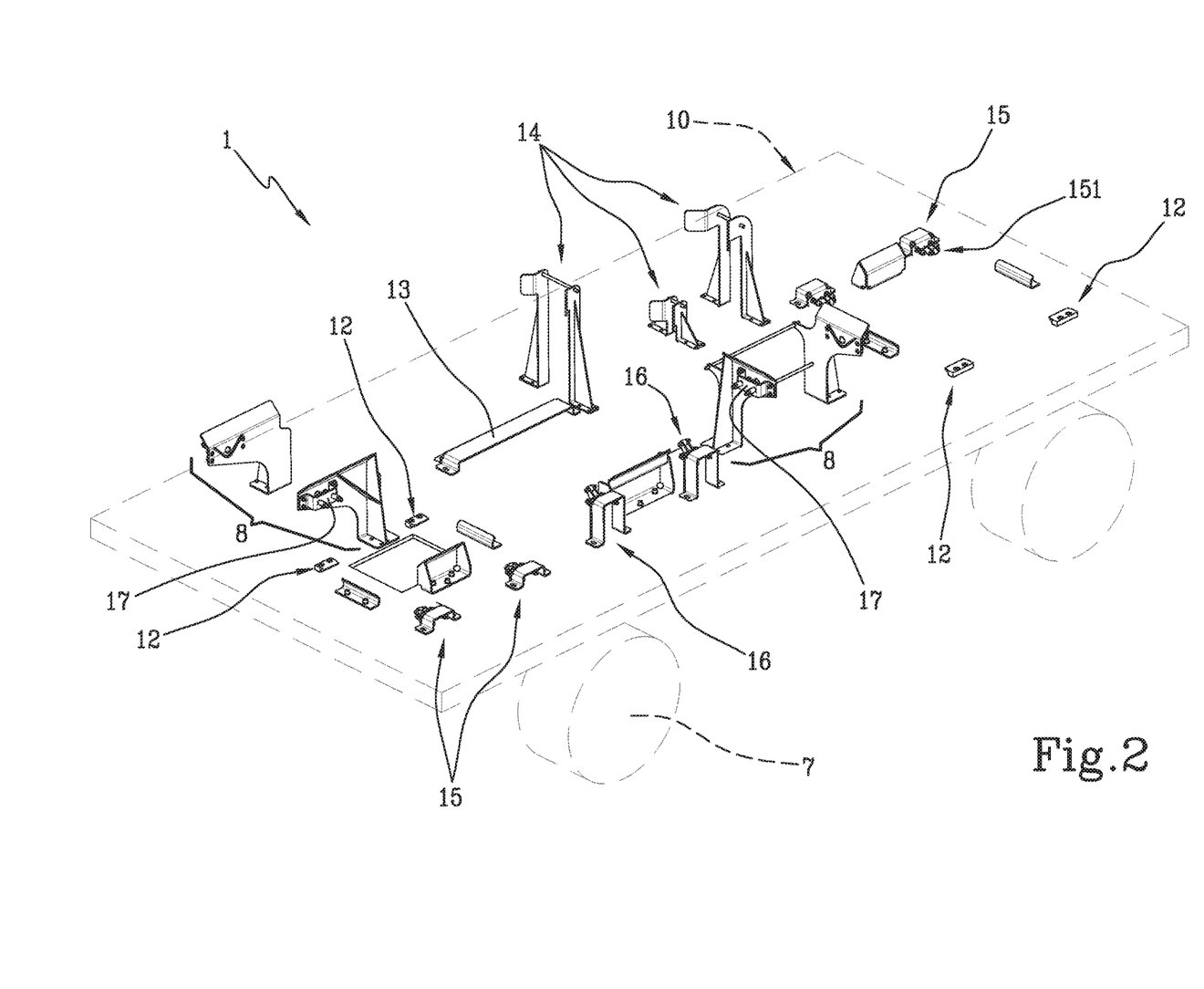
FIG. 2 is the view of the previous figure, without equipment for highlighting the automatic type attachments provided on the platform of the trolley.
Figure 3:
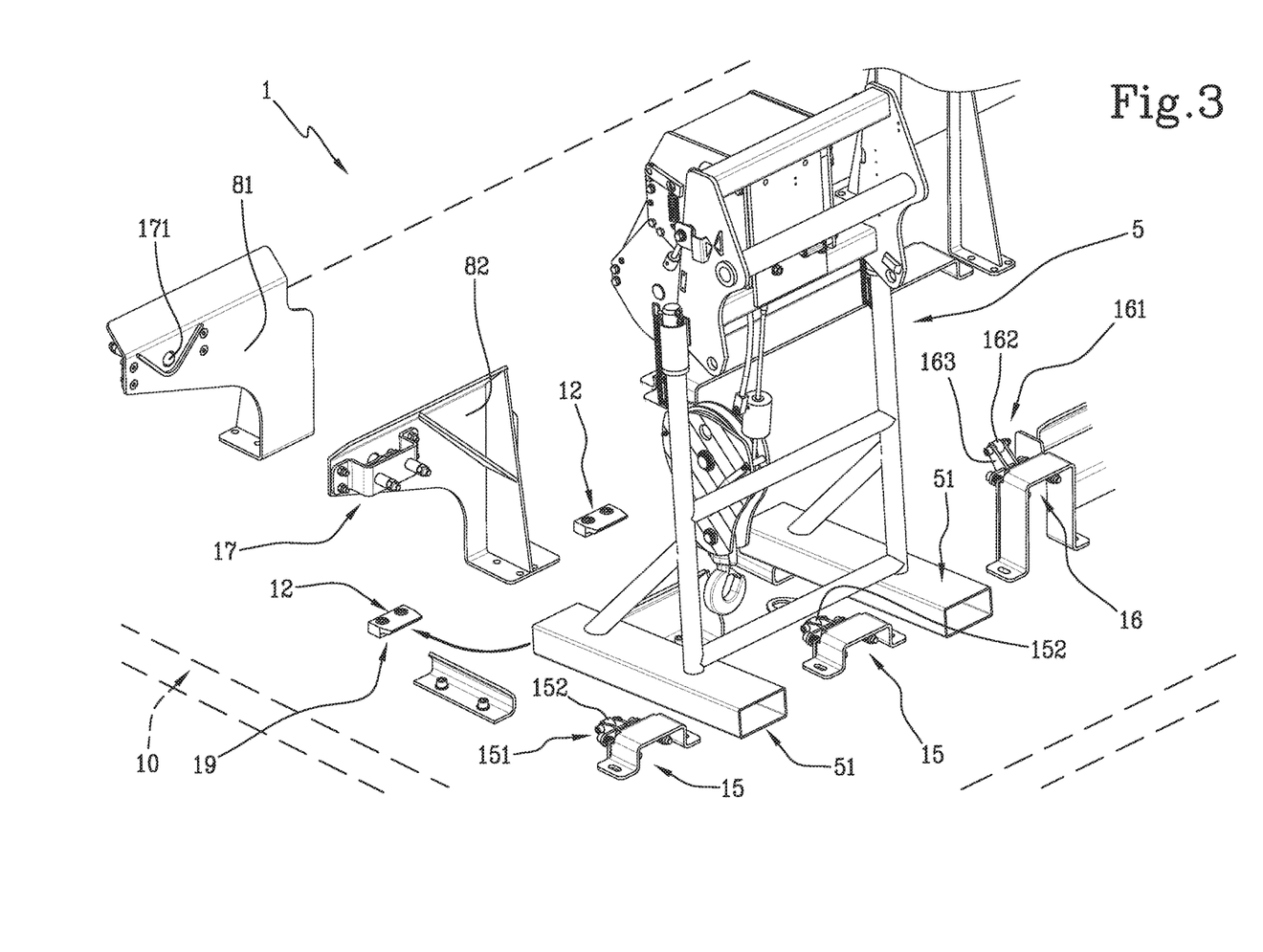
FIGS. 3-11 are axonometric views that represent details of the trolley, represented during the various steps of anchoring of the equipment to respective automatic attachments.

As can be seen in particular in FIGS. 8 and 9, and as can be appreciated in part in FIGS. 1, 2 and 3, this type of attachment unit is especially intended to secure an equipment 3, 6 to the platform 10, said equipment having at least one transversal tubular element 31, 61 preferably circular and comprising opposite open ends.

The equipment that can be coupled to the sphere apparatus may include the jib 6 and the potence curt equipment 3 (or "PC"), having a T-shape that includes a potence curt on which to assemble a fixed hook, the PC 3 being shown in FIGS. 8 and 9, without the hook.

In practice, the movable spheres 171 are arranged opposite one another and are located at a suitable height to allow their insertion in the opposite openings of the tubular element 31, 61 of the equipment 3, 6.

Precisely, the spheres 171 are on the same horizontal axis, at the same height.

In detail, each side 81, 82 comprises an internal flank (or "face"), facing that of the other side, from whose surface, by means of a through hole, the sphere 171 of the relative coupling device 171 projects when it is in the rest position; the sphere 171 is also adapted to move back and disappear into a relevant seat, in the aforementioned retracted position.

The side walls 81, 82 are then at a distance such that, when the equipment 3, 6 is inserted in the cradle 8, for example, at the rear or at the rear from the top, the open ends of the tubular element 31, 61 abut against the spheres 171 so as to push them towards the retracted position.

When the openings of the tubular element 31, 61 are centred with respect to the spheres 171 (or with respect to the axis of translation of the spheres), the latter are pushed out from the elastic element and are inserted in the respective openings to allow the equipment 3, 6 to be locked.

Especially if the equipment 3, 6 engaged on the sphere-operated attachment units 171 is not resting on the platform 10, in order to constrain also its last degree of freedom, particular positioning elements 11 may be provided, which keep the equipment 3, 6 horizontally still.

In the event of the PC 3, the cradle 8 itself may be equipped with one or more crossbars 11 (for example metal rods) which join the two lateral walls 81, 82 and which constitute abutments for the arm 32 of the equipment 3 on which the hook is to be mounted.

In practice, the two positioning crossbars 11 may be located in the cradle 8 so as to define an upper and lower abutment for the arm 32 of the equipment 3, in order to prevent the equipment 3 from rotating about an axis that passes through the spheres 171.

In the event of using this type of cradle 8 with spheres 171 for coupling a jib 6, a front counter-cradle 14 may be provided, placed opposite the cradle adapted to engage the end of the jib 6 opposite the one coupled by the spheres 171.

In detail, the counter-cradle 14 may be provided with two edges joined by at least one crossbar 141 against which said end of the jib 6 is locked.

In even more detail, as shown in the appended figures, the invention may provide a plurality of counter-cradles 14 of different sizes for anchoring jibs 6 of different lengths and sizes.

Figure 12:
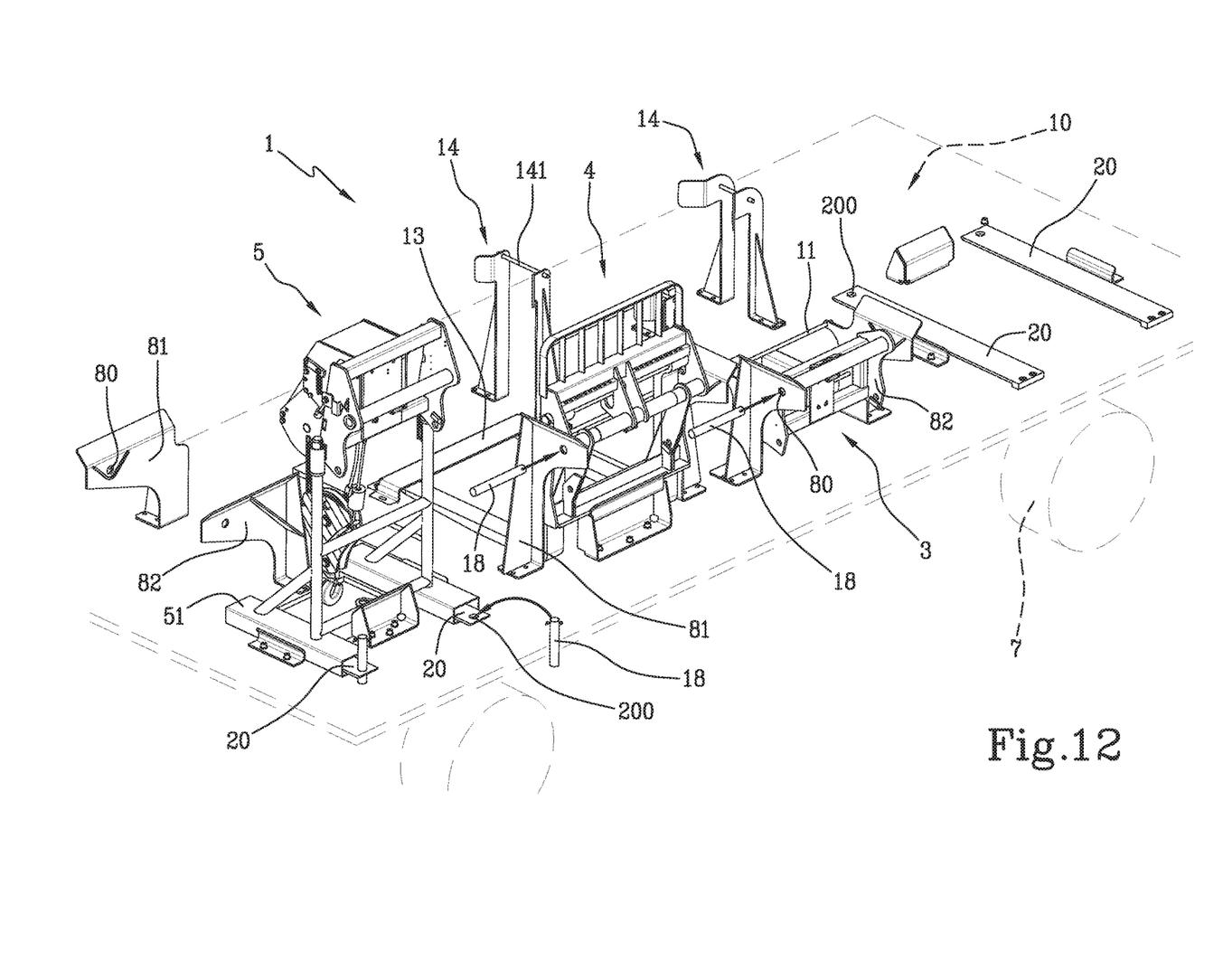
FIG. 12 is an axonometric view of the trolley that mounts manual attachments on its platform, depicted so as to show the anchoring methods of some equipment to this type of attachments.

As mentioned, the invention may also provide manual attachments, illustrated schematically in FIG. 12.

Figure 13:
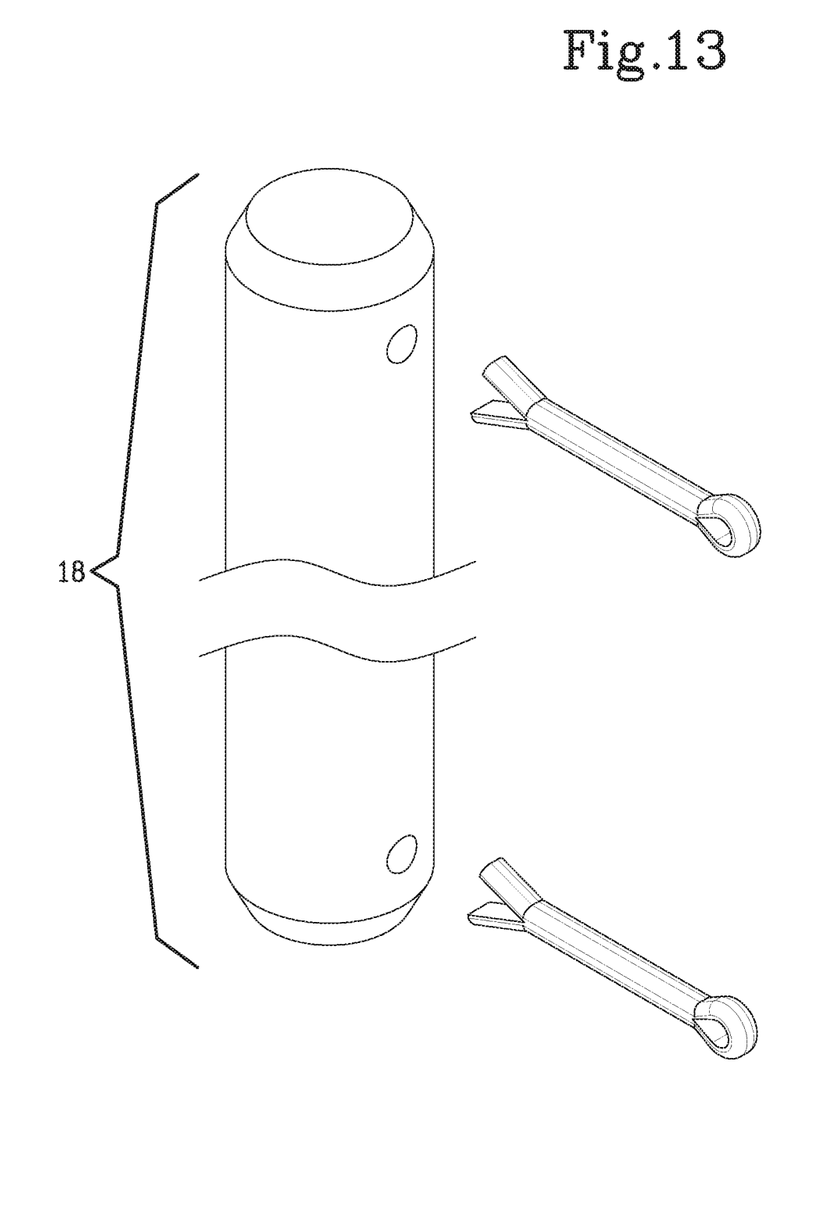
FIG. 13 is a schematic axonometric view of a pin equipped with two cotter pins, that can be used in the manual attachments represented in the previous figure.

Preferably, these types of attachments share the fact that anchoring pins 18 are used, provided with a cotter pin, represented in FIG. 13.

A first type of manual attachment unit is especially provided to secure to the platform 10 an equipment having a pair of tubular elements 21, 51, for example, quadrangular, open at opposite ends and adapted to be forked.

In practice, as already explained, this equipment comprises the load basket 2 and the winch 5, which are, in fact, equipped at the base with a pair of tubular elements 21, 51.

As can be seen in FIG. 12, in which the case of coupling a winch 5 is illustrated, the manual attachment unit may include two positioning elements having respective prongs 20 that define an elongated projecting portion thereof raised off the platform 10.

Such prongs 20 may comprise respective elongated plates.

The prongs 20 are adapted to contextually fork the aforementioned tubular elements 51 and are also equipped with respective through holes 200 for engagement with the relative anchoring pins 18.

As partially mentioned above, the prongs 20, like the other components of the attachment units, may also be movable on the platform 10, so as to adapt the attachments to the different sizes or types of equipment to be anchored.

For example, the prongs 20 may be reciprocally movable so as to regulate their centre-to-centre distance, etc . . . .

Precisely, such holes 200 are located in a portion of the respective prong 20 that comprises the free end that exits from the relative tubular element 51, once it has been inserted by the same prong 20.

In this way, the operator may apply an anchoring pin 18 to each hole 200 defining a constraint that prevents the equipment 5 from coming out from the prongs 20 and, therefore, anchors it securely to the platform 10.

Another type of manual attachment envisages a similar housing structure to the "cradle" 8 discussed above, wherein at the side walls 81, 82, instead of the coupling devices equipped with spheres illustrated above, there are through holes 80.

In this case, by aligning the cross tubular element 31, 41, 61 of forks 4, jibs 6 or other equipment 3 with the two holes 80, it is possible to apply a long anchoring pin 18 which crosses both the holes 80 and the tubular element 31, 41, 61 and projects from opposite ends, where the cotter pins are then inserted.

These manual cradle attachments 8 can be associated with the positioning elements 11, 13, 14, 15 already discussed in the explanation of the automatic attachments.

The operation of the invention is described below.

According to the equipment 2, 3, 4, 5, 6 necessary for the telescopic loader to perform the different operations at the work site, the relative attachment units are chosen, which are appropriately placed on the platform 10 of the trolley 1 exploiting the multiplicity of fastening seats provided thereon.

In detail, the position of the attachments is chosen to maximise the exploitation of the upper surface of the platform 10, according to the equipment to be transported and to obtain the correct distribution of the load.

After this, the equipment 2, 3, 4, 5, 6 is assembled onto the trolley 1, stably secured to the platform 10 by means of the attachments described above, whether they are automatic or manual.

The trolley 1 is then coupled to the telehandler, or another operating machine, and towed by it towards the work site, where the equipment can then be detached in order to be mounted onto the articulated arm, based on the different operations to be performed.

Optionally, the trolley 1 may be equipped with stabilisers, similar to those provided for loaders or other self-propelled operating machines.

In this way, when the trolley 1 is uncoupled from the operating machine, it can be securely stabilised in order to allow safe loading and anchoring of the equipment and safe removal thereof.

It is to be noted that the telehandler, or other operating machine, which transports the trolley 1 is advantageously used for loading and unloading the equipment onto/off the trolley for the purpose of being able to use and transport it independently and without the need or aid of other means.

The invention claimed is:

1. A towable trolley (1) for the transport of equipment (2, 3, 4, 5, 6) intended to be mounted on a telescopic loader or the like, comprising a support platform (10) and movement members (7), for example wheels or the like, characterized by comprising one or more attachment units (8, 11, 12, 13, 14, 15, 16, 17, 18, 20), mounted on said support platform (10) and adapted to stably secure at least one equipment to the platform (10) itself, in which at least one attachment unit comprises at least one positioning element (11, 12, 13, 14, 20), suitable for being mechanically engaged with an equipment, and at least a coupling device (15, 16, 17, 18) able to allow coupling and release of the equipment which is engaged with said positioning element (11, 12, 13, 14, 20), wherein said positioning element (12, 13, 20) comprises a horizontal and/or cantilevered retaining portion.

2. The trolley (1) according to claim 1, in which one or more of said attachment units are adapted to secure to the support platform (10) at least one of the following equipment: a fork (4), an arm for fixed hook (3), a load basket (2), a winch (5), an horizontal beam (6) for cranes.

3. The trolley (1) according to claim 1, in which at least one attachment unit is suitable for attachment of one or more hollow tubular elements (21, 51) thereto, which hollow tubular elements (21, 51) exhibit a quadrangular section and are provided on an equipment (2, 5).

4. The trolley (1) according to claim 1 in which at least one attachment unit is adapted to be attached to at least one tubular element (31, 61) exhibiting a substantially circular cross section, provided on an equipment (3, 6).

5. The trolley (1) according to claim 1, in which one or more attachment units are adapted to automatically engage one or more equipment (2, 3, 4, 5, 6).

6. The trolley (1) according to claim 5,
wherein said coupling device (15, 16, 17) comprises:
at least one movable element (151, 161, 171); and
at least one elastic contrast element acting on said movable element (151, 161, 171).

7. The trolley (1) according to claim 6, wherein said movable element is provided with a rotatable contact member (152, 162, 171).

8. The trolley (1) according to claim 1, wherein said positioning element (12, 13) comprises a retaining portion which inferiorly defines an undercut (19).

9. The trolley (1) according to claim 7, comprising at least one attachment unit having at least one coupling device (15, 16, 17), the movable element (151, 161, 171) of which is suitable to be displaced between a retracted position and an extended position.

10. The trolley (1) according to claim 7, comprising at least one attachment unit provided with at least one coupling device (15, 16) having a movable element (151,161), which exhibits a projecting arm provided with a contact roller (152, 162).

11. The trolley (1) according to claim 7, comprising at least one attachment unit provided with at least one coupling device (17), provided with a movable element comprising at least a sphere (171).

12. The trolley (1) according to claim 1, wherein the coupling device of at least one attachment unit comprises at least an anchoring pin (18) provided with a cotter pin and suitable for the manual anchoring of at least one equipment.

13. A towable trolley (1) for the transport of equipment (2, 3, 4, 5, 6) intended to be mounted on a telescopic loader or the like, comprising a support platform (10) and movement members (7), for example wheels or the like, characterized by comprising one or more attachment units (8, 11, 12, 13, 14, 15, 16, 17, 18, 20), mounted on said support platform (10) and adapted to stably secure at least one equipment to the platform (10) itself, in which at least one attachment unit comprises at least one positioning element (11, 12, 13, 14, 20), suitable for being mechanically engaged with an equipment, and at least a coupling device (15, 16, 17, 18) able to allow coupling and release of the equipment which is engaged with said positioning element (11, 12, 13, 14, 20), wherein at least one attachment unit comprises a housing structure (8) provided with two side walls (81, 82) between which an equipment (3, 4, 6) can be inserted, said side walls (81, 82) being adapted to cooperate functionally with at least one coupling device (17, 18) in order to anchor the inserted equipment to the platform (10).

14. The trolley (1) according to claim 11, wherein at least one attachment unit comprises a housing structure (8) provided with two side walls (81, 82) between which an equipment (3, 4, 6) can be inserted, said side walls (81, 82) being adapted to cooperate functionally with at least one coupling device (17, 18) in order to anchor the inserted equipment to the platform (10), and wherein each coupling device (17) is mounted on a respective side wall (81, 82) with the respective spheres (171) which project inwardly the structure (8).

15. The trolley (1) according to claim 1, wherein the coupling device of at least one attachment unit comprises at least an anchoring pin (18) provided with a cotter pin and suitable for the manual anchoring of at least one equipment, the trolley (1) further comprising at least one attachment unit which comprises at least two positioning elements having respective prongs (20) that define the relative retaining portion, said prongs (20) being provided with respective through holes (200) for engagement with corresponding anchoring pins (18).

* * * * *